(12) United States Patent
McMunn et al.

(10) Patent No.: US 12,049,104 B2
(45) Date of Patent: Jul. 30, 2024

(54) REMOTELY OPERABLE CLAMP DEVICE

(71) Applicant: KAL TIRE, Vernon (CA)

(72) Inventors: Clayton Wilford Russell McMunn, Lake Country (CA); Miguel Paul Eagleton, Kelowna (CA)

(73) Assignee: KAL TIRE, Vernon (CA)

( * ) Notice: Subject to any disclaimer, the term of this patent is extended or adjusted under 35 U.S.C. 154(b) by 0 days.

(21) Appl. No.: 17/905,020

(22) PCT Filed: Feb. 26, 2021

(86) PCT No.: PCT/CA2021/050240
§ 371 (c)(1),
(2) Date: Aug. 25, 2022

(87) PCT Pub. No.: WO2021/168579
PCT Pub. Date: Sep. 2, 2021

(65) Prior Publication Data
US 2023/0143117 A1    May 11, 2023

(30) Foreign Application Priority Data
Feb. 28, 2020   (CA) ................................. CA 3074366

(51) Int. Cl.
*B60B 29/00*   (2006.01)
(52) U.S. Cl.
CPC ....... *B60B 29/006* (2013.01); *B60Y 2200/148* (2013.01); *B60Y 2200/22* (2013.01); *B60Y 2200/411* (2013.01)
(58) Field of Classification Search
CPC . B60B 29/00; B60B 2340/32; B60B 2340/34; B25B 27/02; B25B 23/103
See application file for complete search history.

(56) References Cited

U.S. PATENT DOCUMENTS

| 1,828,523 A | * | 10/1931 | Decker | ................. | B25B 23/103 |
| | | | | | 81/53.2 |
| 2,251,491 A | * | 8/1941 | Lozen | .................. | B25B 23/103 |
| | | | | | 81/53.2 |

(Continued)

FOREIGN PATENT DOCUMENTS

| CA | 3074366 A1 | 8/2001 |
| CN | 210027978 U | 2/2020 |

(Continued)

OTHER PUBLICATIONS

International Search Report and Written Opinion issued in International Application No. PCT/CA2021/050240, dated May 5, 2021.

(Continued)

*Primary Examiner* — Michael W Hotchkiss
(74) *Attorney, Agent, or Firm* — Knobbe, Martens, Olson & Bear, LLP

(57) ABSTRACT

Clamp devices can be operated remotely to facilitate the installation, removal and other handling of wheels and tires for large vehicles. The clamp devices generally include an attachment mechanism, a gripping mechanism, an actuating link operable to move the gripping mechanism between an open and closed position, an actuator to activate the actuating link, a transmitter for sending command signals to the clamp devices for the purpose of opening or closing the gripping mechanism and a receiver for receiving such command signals.

16 Claims, 11 Drawing Sheets

(56) References Cited

U.S. PATENT DOCUMENTS

| | | | | |
|---|---|---|---|---|
| 2,562,307 | A | * | 7/1951 | Flugrath .............. B25B 23/103 81/98 |
| 2,613,564 | A | * | 10/1952 | Walraven ............. B25B 23/103 81/53.2 |
| 2,701,489 | A | * | 2/1955 | Osborn ................ B25B 23/103 81/53.2 |
| 3,793,912 | A | * | 2/1974 | Bilz ........................ B25B 23/14 81/53.2 |
| 4,283,827 | A | * | 8/1981 | Abel ...................... B25B 27/02 29/254 |
| 4,476,749 | A | * | 10/1984 | McKean .............. B25B 21/002 81/53.2 |
| 4,675,968 | A | * | 6/1987 | Bartlett .................. B25B 27/02 29/254 |
| 5,251,515 | A | * | 10/1993 | Merrick ................. B25B 13/44 81/53.2 |
| 5,315,902 | A | * | 5/1994 | Ragland ............. B25B 13/5016 81/53.2 |
| 7,296,330 | B2 | * | 11/2007 | Bergman ........... B25B 27/0035 29/254 |
| 7,578,066 | B1 | * | 8/2009 | Pellegrino ............. G01B 5/255 248/220.21 |
| 7,926,189 | B1 | * | 4/2011 | Pellegrino ............ B60B 29/001 33/203.18 |
| 8,696,286 | B1 | * | 4/2014 | Martin .................... B60B 29/00 269/95 |
| 9,044,999 | B2 | * | 6/2015 | Dillon .................... B60B 30/08 |
| 9,096,095 | B2 | * | 8/2015 | Hedley ................... B60B 29/00 |
| 9,574,598 | B1 | | 2/2017 | Carmichael et al. |
| 9,943,950 | B2 | * | 4/2018 | Buchan ................ B25B 27/023 |
| 10,549,355 | B1 | * | 2/2020 | Parker ................... B60B 29/006 |
| 2006/0042424 | A1 | * | 3/2006 | Pirseyedi ................ B25B 13/44 81/163 |
| 2008/0010800 | A1 | * | 1/2008 | Bergman ........... B25B 27/0035 29/254 |
| 2011/0197416 | A1 | * | 8/2011 | Hedley .................. B60B 30/00 414/469 |
| 2012/0074762 | A1 | | 3/2012 | Pope |
| 2012/0311843 | A1 | * | 12/2012 | Sales, Sr. ................ B60B 29/00 29/273 |
| 2015/0231923 | A1 | * | 8/2015 | Dillon .................... B62D 65/12 301/105.1 |
| 2016/0176031 | A1 | * | 6/2016 | Buchan ................ B25B 23/103 29/244 |
| 2016/0250891 | A1 | * | 9/2016 | Trejo ..................... F16M 11/28 29/402.08 |
| 2019/0185087 | A1 | * | 6/2019 | Moraes ................. F16M 13/02 |
| 2020/0376671 | A1 | * | 12/2020 | Taylor ................... B25J 9/1687 |
| 2021/0114408 | A1 | * | 4/2021 | Darolfi .................... B23P 19/06 |

FOREIGN PATENT DOCUMENTS

| | | |
|---|---|---|
| CN | 112319127 A | 2/2021 |
| WO | WO 2012/094706 A1 | 7/2012 |
| WO | WO 2014/081573 A1 | 5/2014 |
| WO | WO-2019210390 A1 * | 11/2019 |

OTHER PUBLICATIONS

Minexpo International, "*Kal Tire's Innovation Centre Unveils New Tools that Significantly Reduce Risk and Wheel Failure*", Aug. 8, 2021 (Aug. 8, 2021), in 9 pages.

Crownsmenpartners, "*TSC Special: Endless Innovation by Kal Tire Mining Group from MINExpo 2021*", Youtube, Sep. 14, 2021 (Sep. 14, 2021), [online] [retrieved on Apr. 3, 2023 (Mar. 4, 2023)]. Retrieved from the Internet: https://youtu.be/zaY580ltrik?1=216.

Michael Philipps, "*Removing the hazard and increasing safety*", Safe to Work, Feb. 6, 2022 (Jun. 2, 2022), in 6 pages.

International Search Report issued in International Application No. PCT/CA2022/051299, dated May 10, 2023.

Supplementary European Search Report issued in EP Application No. 21759880.4, dated Feb. 9, 2024.

Office Action issued in Chilean Application No. 202202245, dated Sep. 20, 2023.

* cited by examiner

REMOTELY OPERABLE CLAMP DEVICE

CROSS REFERENCE TO RELATED APPLICATIONS

Not Applicable.

FIELD

The present invention is generally directed to clamp devices which may be operated remotely to facilitate the installation, removal and other handling of wheels and tires for large vehicles.

BACKGROUND

Large vehicles, such as wheel loaders, backhoes, tractors, graders, trenchers, semi-trucks and the like, are often equipped with wheels that have diameters larger than human height and with tire/wheel combinations that weigh several thousand pounds. Such wheels cannot be manually manipulated. Further, even with mechanical lifting assistance, it can be difficult and dangerous to maneuver very heavy wheels into proper alignment with hubs, lugs and other connections necessary for mounting and removal from a vehicle. These difficulties are often exacerbated by a lack of working room around the wheel and the need to work on a vehicle in the field rather than a shop.

For example, with current methods of removing off-the-road (OTR) wheels, it is necessary to utilize a tire manipulator to safely hold the wheel while a technician removes/installs the last two/first two lug nuts of the wheel. The manipulator prevents the wheel from potentially tipping over and injuring the technician. However, it is unsafe for the technician to remove/install the remaining lug nuts while the tire manipulator is in the work area since the tire manipulator is a large piece of heavy machinery with the potential to injure the technician as well.

Accordingly, it would be desirable to have a device which could be operated remotely by the technician to assist in the process of removing and installing the OTR wheels from the vehicle in order to improve the overall safety of such process.

SUMMARY

According to one embodiment, the present disclosure provides a remotely operated clamp device for securely holding a wheel stud of a wheel. The clamp device generally includes: a gripping mechanism sized and adapted for gripping the wheel stud, the gripping mechanism being movable between an open position and a closed position; an actuating link engaging the gripping mechanism, the actuating link being selectively movable between a first position and a second position, where the gripping mechanism is in the open position when the actuating link is in the first position and the gripping mechanism is in the closed position when the actuating link is in the second position; an actuator engaging the actuating link and configured to selectively move the actuating link to the first position and the second position; an attachment mechanism for attaching the clamp device to the wheel; a transmitter for transmitting operating commands inputted by a user; and a receiver for controlling the actuator and causing the actuator to selectively move the actuating link to the first position and to the second position in response to the operating commands. According to some embodiments, the clamp device may further include a signal for indicating the position of the gripping mechanism and a height adjustable platform for raising and lowering the clamp device.

In another embodiment, there is provided a method of temporarily holding a wheel mounted onto a hub of a large vehicle, the hub having a plurality of studs onto which the wheel is mounted. The method includes the steps of:

(a) attaching the clamp device of the present disclosure by the attachment mechanism to the wheel over and in line with a stud selected from the plurality of wheel studs;

(b) transmitting a first operating command by the transmitter to the receiver to cause the actuator to move the actuating link to the second position thereby moving the gripping mechanism to the closed position to hold the wheel mounted onto the hub;

(c) transmitting a second operating command by the transmitter to the receiver to cause the actuator to move the actuating link to the first position thereby moving the gripping mechanism to the open position; and (d) releasing the attachment mechanism from the wheel.

BRIEF DESCRIPTION OF THE DRAWINGS

The structure, operation, and advantages of the present invention will become further apparent upon consideration of the following description taken in conjunction with the accompanying figures. The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

DETAILED DESCRIPTION

The present disclosure is directed to a clamp device configured to be remotely opened and closed and which may be used as a substitute to lug nuts during the installation and removal of wheels of large vehicles. The clamp device is characterized by an actuating link attached to a gripping mechanism that is selectively movable between a first position, opening the gripping mechanism, and a second position, closing the gripping mechanism. The clamp device further includes an actuator, a transmitter, a receiver and an attachment mechanism. The actuator engages the actuating link and selectively moves the actuating link between the first position and the second position. The transmitter transmits operating commands, inputted by a user, to the receiver. The receiver controls the actuator and causes the actuator to selectively move the actuating link between the first position and the second position in response to operating commands from the transmitter. The attachment mechanism allows for selective attachment of the clamp device to a wheel.

The clamp device of the present disclosure offers numerous advantages over the prior art. For example, as the clamp device can be securely attached to and released from wheel studs remotely by a user, the possibility of the wheel tipping over and injuring the user during installation and removal of the wheel is eliminated. Also, the present clamp device allows the technicians to be situated away from the tire manipulator during the installation and removal process to further improve the safety of the work environment.

Figure 1:
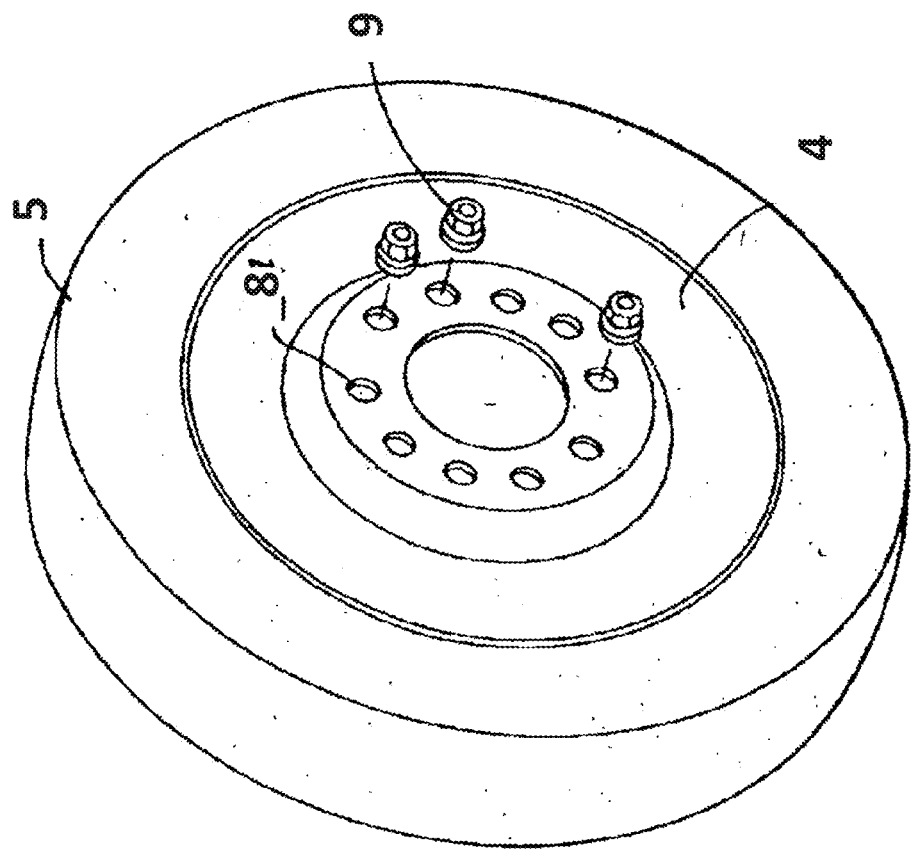
FIG. 1 is an exploded perspective view of a wheel mounting assembly.
Figure 1:
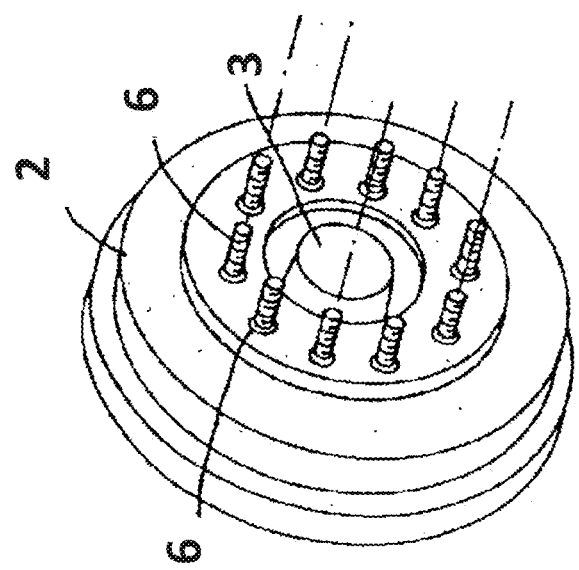

With reference to FIG. 1, there is shown a typical wheel mounting assembly, such as those used on a tractor or other large vehicle, for which the clamp device of the present disclosure may be attached thereto. The wheel mounting assembly may generally include a brake drum 2 mounted to a hub 3. Mounted to the hub 3 and extending therefrom is a plurality of externally threaded bolts or studs 6. The studs 6 may be configured in a generally circular arrangement with each being circumferentially spaced apart from the other. In the embodiment shown, there are ten studs. The number of studs however may vary more or less. Stud holes 8 are formed on in the wheel 4 and receive studs 6 when the wheel 4 is mounted to the hub 3 and drum 2. Internally threaded lug nuts 9 are provided for each stud 6 to secure the wheel to the hub 3 and drum 2.

With reference now to FIGS. 2 to 7, according to one embodiment a clamp device 10 is shown that is capable of replacing a lug nut during the installation/removal of the wheel from the large vehicle and which is operable to be opened and closed remotely to improve the overall safety of such installation/removal. The clamp device 10 includes a gripping mechanism 25, shown as a pair of pivotally attached jaws 25a and 25b, movable between an open position in which the jaws are separated from one another to accommodate the stud, and a closed position in which the jaws are brought close to another and define a housing 12 for the stud so as to grip the stud and hold it securely. The housing 12 that is defined by the pair of jaws in the closed position is adapted to the contour of the zone for grabbing the stud. In this particular instance, this contour is circular, and is therefore by a circle that the housing 12 is shown. For this purpose, each jaw has, on the side of the front end, a recess in the shape of an arc whose radius corresponds to that of the stud. The clamp device 10 is designed such that the pair of jaws 25a, 25b may be interchanged with other pairs of jaws which define other sizes and shapes of housings 12 to accommodate different stud sizes, shapes and pitch. In this embodiment, the inner surfaces 25c of the jaws are shown as threaded although in other embodiments such surfaces may be non-threaded or relatively smooth. Each jaw 25a, 25b is advantageously made from a metal or aluminum alloy.

The clamp device 10 also includes an attachment mechanism 22 by which the clamp device 10 may be attached to the wheel 4. In the embodiment shown in FIGS. 2 to 7, the attachment mechanism 22 comprises a magnet. The magnet may be any type of magnet known to those skilled in the art which is operable to provide a strong external magnetic field for attachment to an external ferromagnetic material. For example, the magnet may be a switchable magnetic device. Such switchable magnetic devices generally include a magnet housing 22a, a first permanent magnet and a second permanent magnet (not shown), the first and second permanent magnets being diametrically polarized. The first and second permanent magnets are mounted within the magnet housing 22a such that the first and second permanent magnets are rotatable relative to each other. A lever 22b may be used for causing relative rotation of the first and second permanent magnets. For instance, when the first and second permanent magnets are positioned relative to each other such that a north pole and a south pole of the first magnet are in substantial alignment with respective north and south poles of the second magnet, the magnetic device presents a relatively strong external magnetic field and can be secured to the wheel 4. The lever 22b may be turned to cause relative rotation of the first and second magnets such that the north pole of the first magnet is in substantial alignment with the south pole of the second magnet and vice versa and therefore the magnetic device will present a relatively weak external magnetic field allowing the magnetic device to be released from the wheel 4. The lever 22b may be positioned and configured on the housing 22a to allow it to be accessible from the rear of the clamp device 10.

Figure 2:
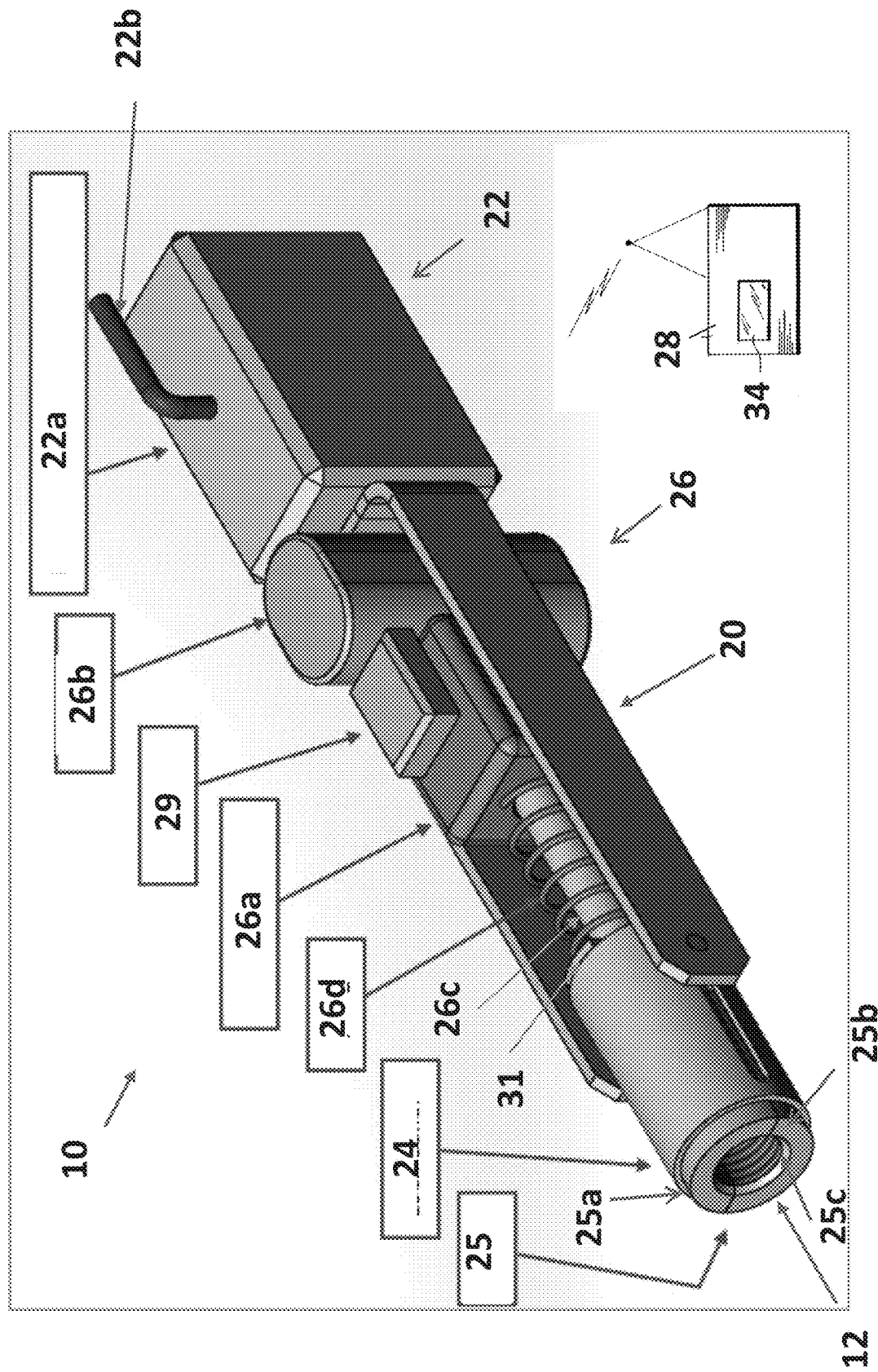
FIG. 2 is a side perspective view of the clamp device according to a first embodiment in a closed position.
Figure 3:
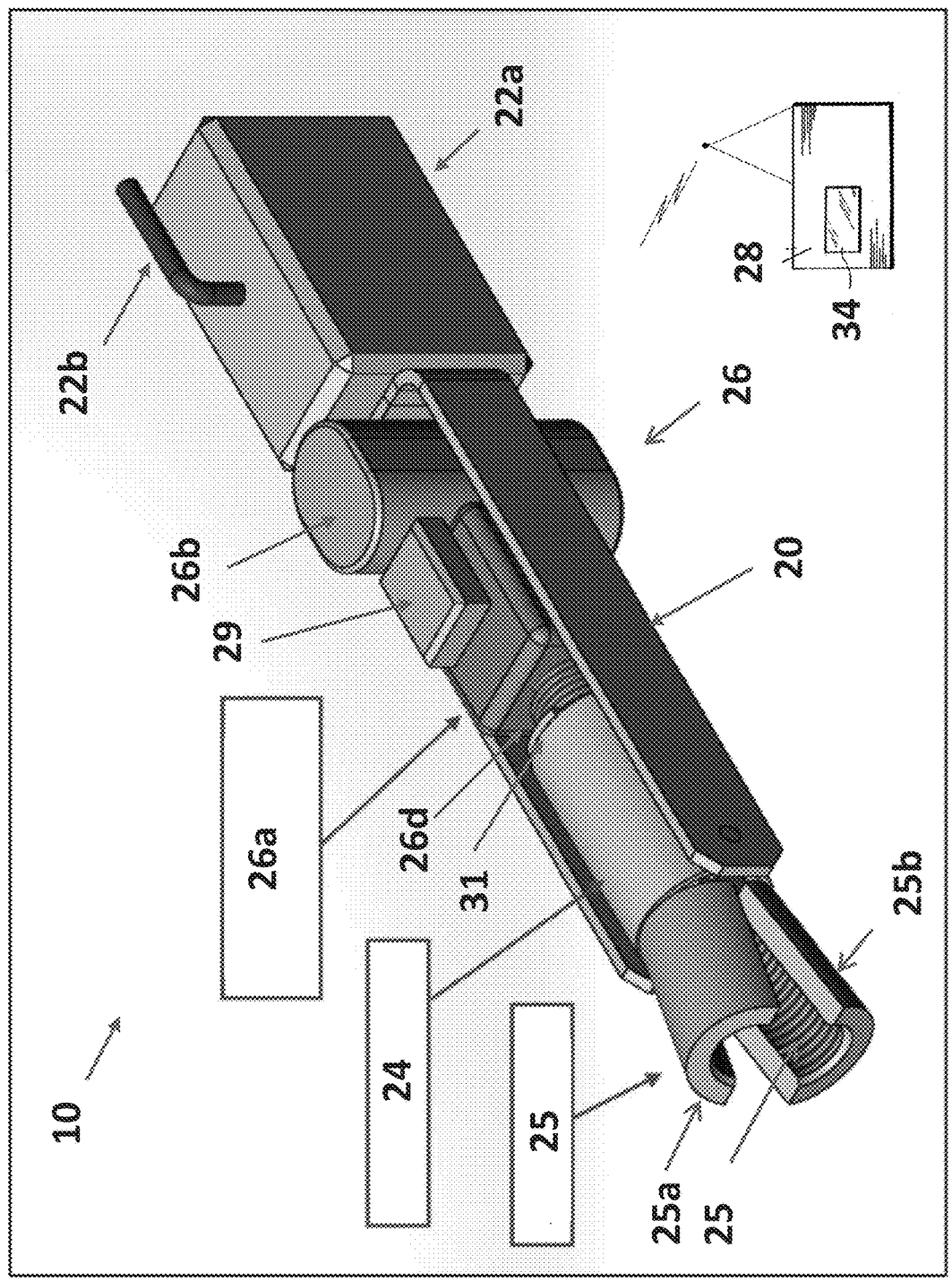
FIG. 3 is a side perspective view of the clamp device of FIG. 2 in an open position.
Figure 4:
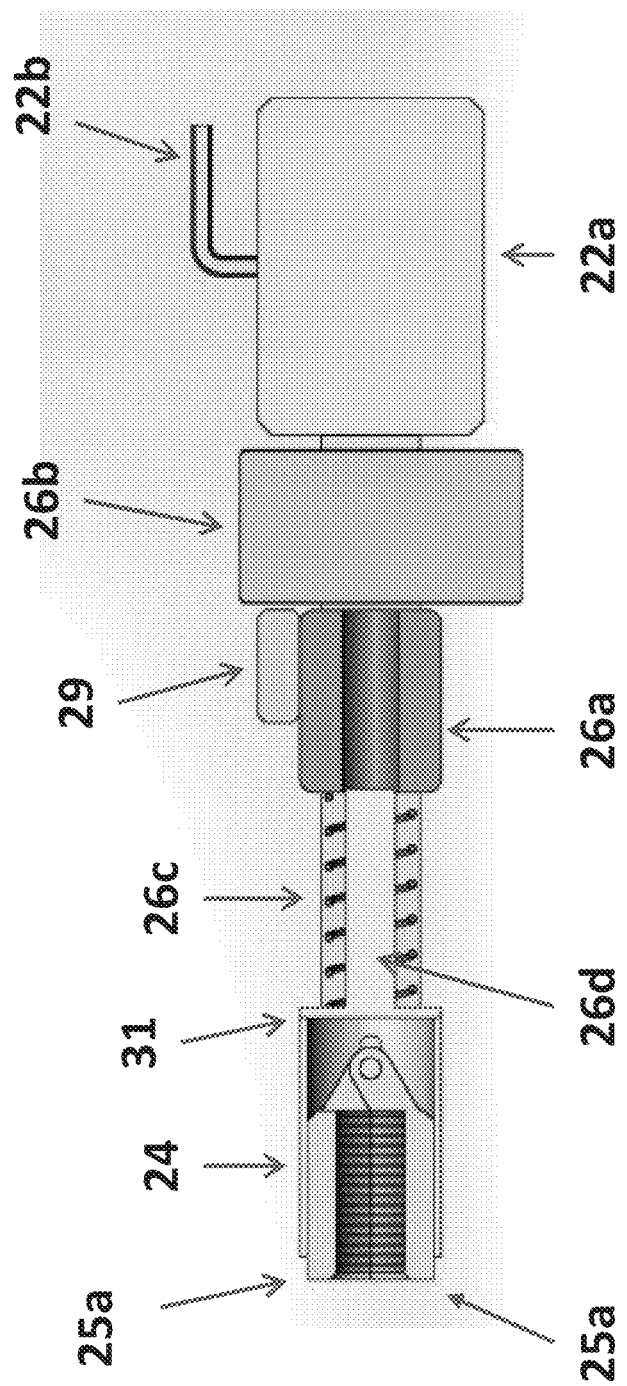
FIG. 4 is a cross-sectional view of the clamp device of FIG. 2 in a closed position.
Figure 5:
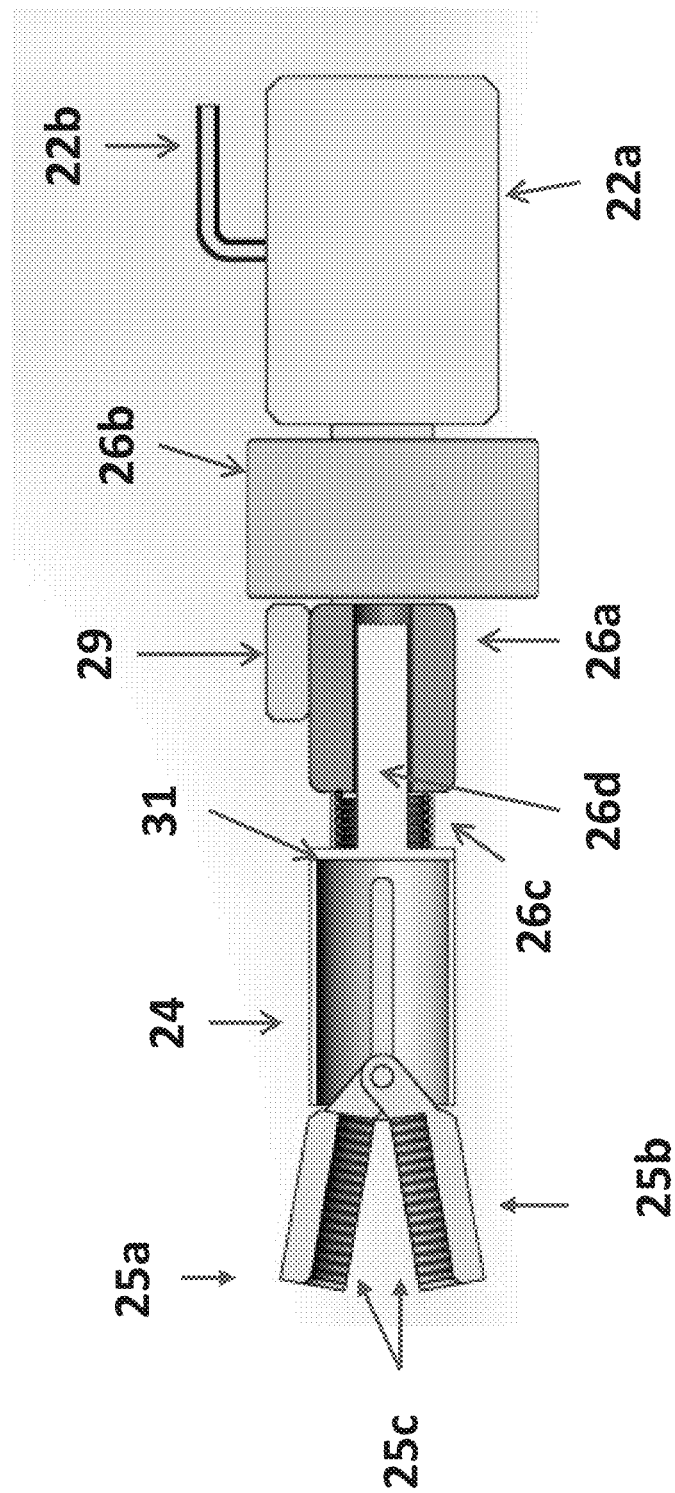
FIG. 5 is a cross-sectional view of the clamp device of FIG. 2 in an open position.
Figure 6:
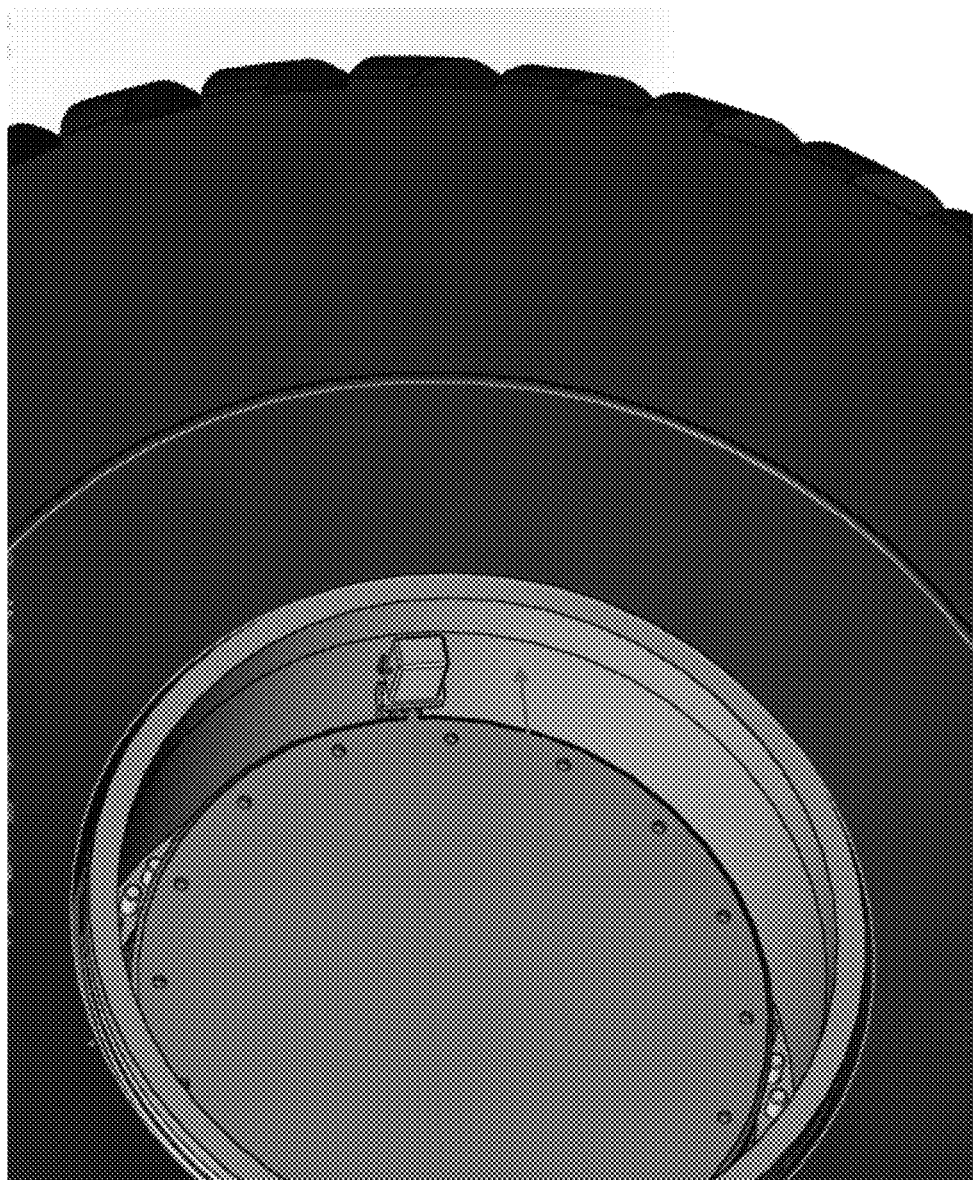
FIG. 6 is a side perspective view of the clamp device of FIG. 2 attached to a wheel.
Figure 7:
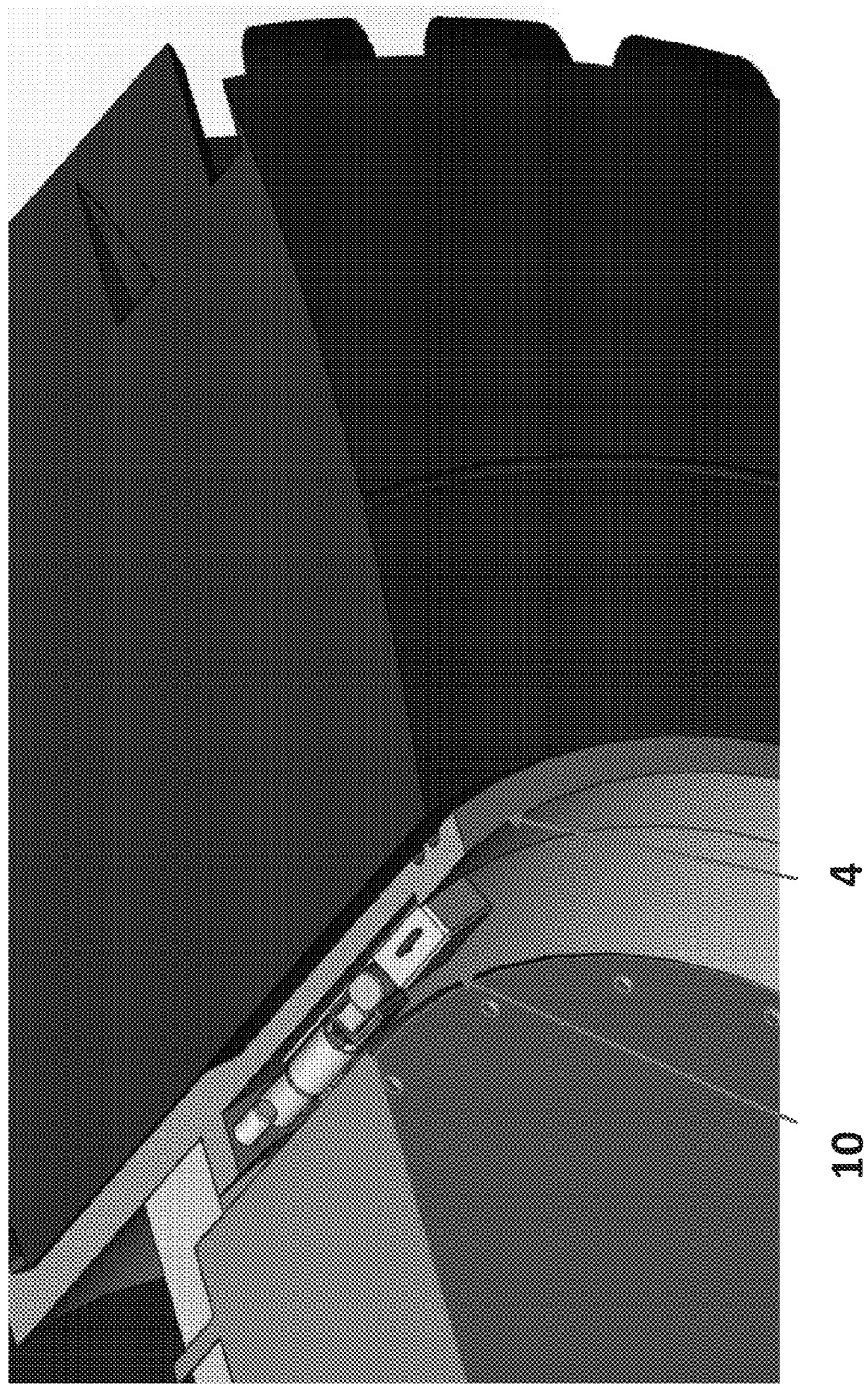
FIG. 7 is a side perspective view of the clamp device of FIG. 2 attached to a wheel and gripping a stud of a hub with a section of the wheel and tire removed for clarity.

The clamp device 10 further includes an actuating link 24, an actuator 26, a transmitter 28 and a receiver 29. The actuating link 24 is in engagement with the gripping mechanism 24. In the embodiment shown in FIGS. 2 to 7, the actuating link 24 is in the form of a collar that is in engagement with and configured to be movably disposed over the pair of jaws 25a, 25b. As noted above, the actuating link 24 is selectably movable between a first position and a second position. In the first position, the actuating link 24 moves the gripping mechanism 25 into the open position as shown in FIG. 3. In the second position, the actuating link 24 moves the gripping mechanism 25 into the closed position as shown in FIG. 2. The actuator 26 engages the actuating link 24 at a rear portion 31 and moves the actuating link 24 between the first and second positions along a linear axis.

The actuator 26 may be any well-known electrical, mechanical, hydraulic, or pneumatic device capable of moving or controlling something. In the embodiment shown in FIGS. 2 to 7, the actuator 26 is an electromagnetic actuator. The electromagnetic actuator generally includes an electromagnet 26a, a battery 26b, a magnetic movable member 26c and a spring 26d. The electromagnet 26a will generally include an electric coil wound around a magnetic stationary member (not shown). The battery 26b may be any type of battery well-known to those skilled in the art, such as a rechargeable or non-rechargeable lithium ion (e.g., lithium iron phosphate, lithium cobalt oxide, other lithium metal oxides, etc.), lithium ion polymer, nickel metal hydride, nickel cadmium, nickel hydrogen, nickel zinc or silver zinc battery. In general, the battery 26b may be positioned near the rear of the clamp device 10 for ease of accessibility. The movable member 26c, shown in the form of a rod, is in direct engagement with the rear portion 31 of actuating link 24. FIG. 2 depicts one condition in which the electric coil is not energized. Under this condition, the movable member 26c is maintained in a first state with the actuating link 24 in the second position by means of the bias force caused by spring 26d. Under this condition, if the electric coil is supplied with a current of predetermined value by the battery 26b, an electromagnetic attractive force greater than the bias force generated by the spring 26d is generated between the magnetic stationary member and the movable member 26c. The movable member 26c is changed into a second state as shown in FIG. 3 in which the movable member 26c is attracted to the magnetic stationary member. According to this movement, the actuating link 24 is mechanically actuated and moves from the second position to the first position. The actuator 26 will return to the first state shown in FIG. 2 when the electric coil is free from the energizing current supplied by the battery 26b.

The transmitter 28 produces an operating command, in the form of a signal, when activated by the user. Preferably, a wireless transmitter is used such that the signal produced by the transmitter 28 is in the form of wireless energy, such as laser, infrared, or microwave energy or radio waves. The receiver 29 controls the actuator 26 and causes the actuator 26 to selectively move the actuating link 24 to the first position and to the second position in response to the operating commands from the transmitter 28. Such transmitters and receivers are well known in the art and will not be described herein in detail.

The various internal components of the clamp device 10 may be held together by a frame 20. One or more of the internal components of the clamp device may also be housed together in an outer housing (not shown). In some embodiments the frame and outer housing may be constructed of a rigid and durable material such that moisture and potential impacts to the frame and outer housing will not damage the internal components of the clamp device 10. Such materials may include plastics, rubber, silicone, metals, alloys, treated nylons, cloth, canvas, leather and combinations thereof.

In operation, the frame 20, including the gripping mechanism 25, the actuating link 24, the actuator 26 and the receiver 29, are mounted on wheel 4 adjacent to a stud by means of the attachment mechanism 22. The rear portion 31 of the actuating link 24 is engaged with the actuator 26 and the gripping mechanism 25 is in the open position. A push of the button 34 on the transmitter 28 sends a first command signal to the receiver 29. In response to the first command signal, the receiver 29 causes the actuator 26 to move the actuating link 24 to the second position, thereby moving the gripping mechanism 25 to the closed position to securely hold the wheel stud. The gripping mechanism 25 is held closed by the actuating link 24 and actuator 26 until the button 34 on the transmitter 28 is pushed again, after which the actuator 26 moves the actuating link 24 to the first position, thereby moving the gripping mechanism 25 to the open position. Alternatively, more than one push, such as two pushes of the transmitter button 34, sends a second command signal to the receiver 29. In response to the second command signal, the receiver 29 causes the actuator 26 to move the actuating link 24 to the first position, thereby moving the gripping mechanism 25 to the open position. To further insure that the gripping mechanism 25 remains in the closed position, the transmitter 28 and receiver 29 may be programmed such that the actuator 26 moves the actuating link 24 to the second position every second outside of a programmed time (for e.g. 15 second cycle). In some embodiments, there may be two buttons 34 requiring each to be pushed to send command signals to the receiver 29 to prevent accidental operation. Also, the gripping mechanism 25 may be manually moved between the open and closed positions anytime by the user, for example, using a toggle switch connected to the actuator 26 (not shown).

Figure 8:
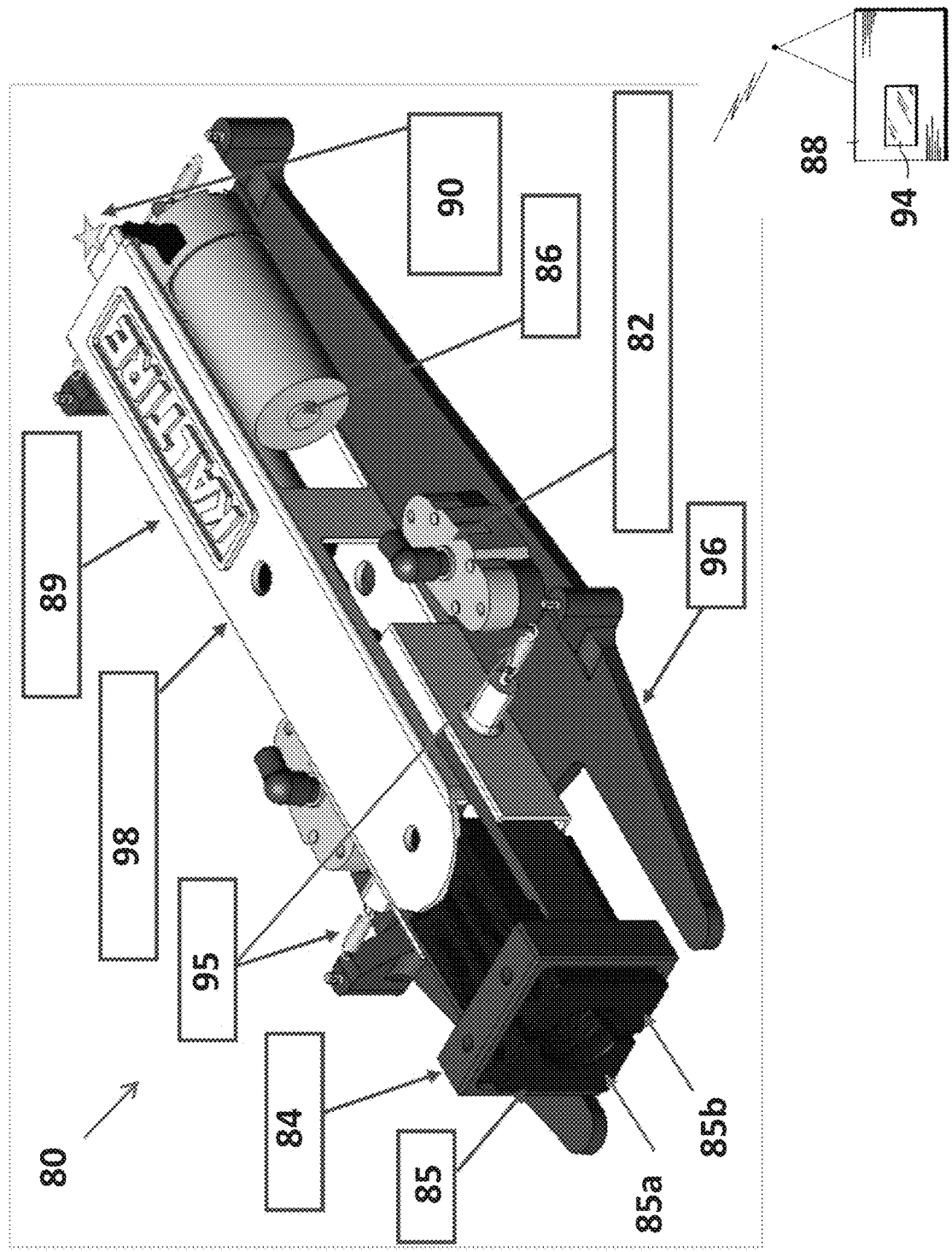
FIG. 8 is a side perspective view of a clamp device according to a second embodiment in a closed position.
Figure 9:
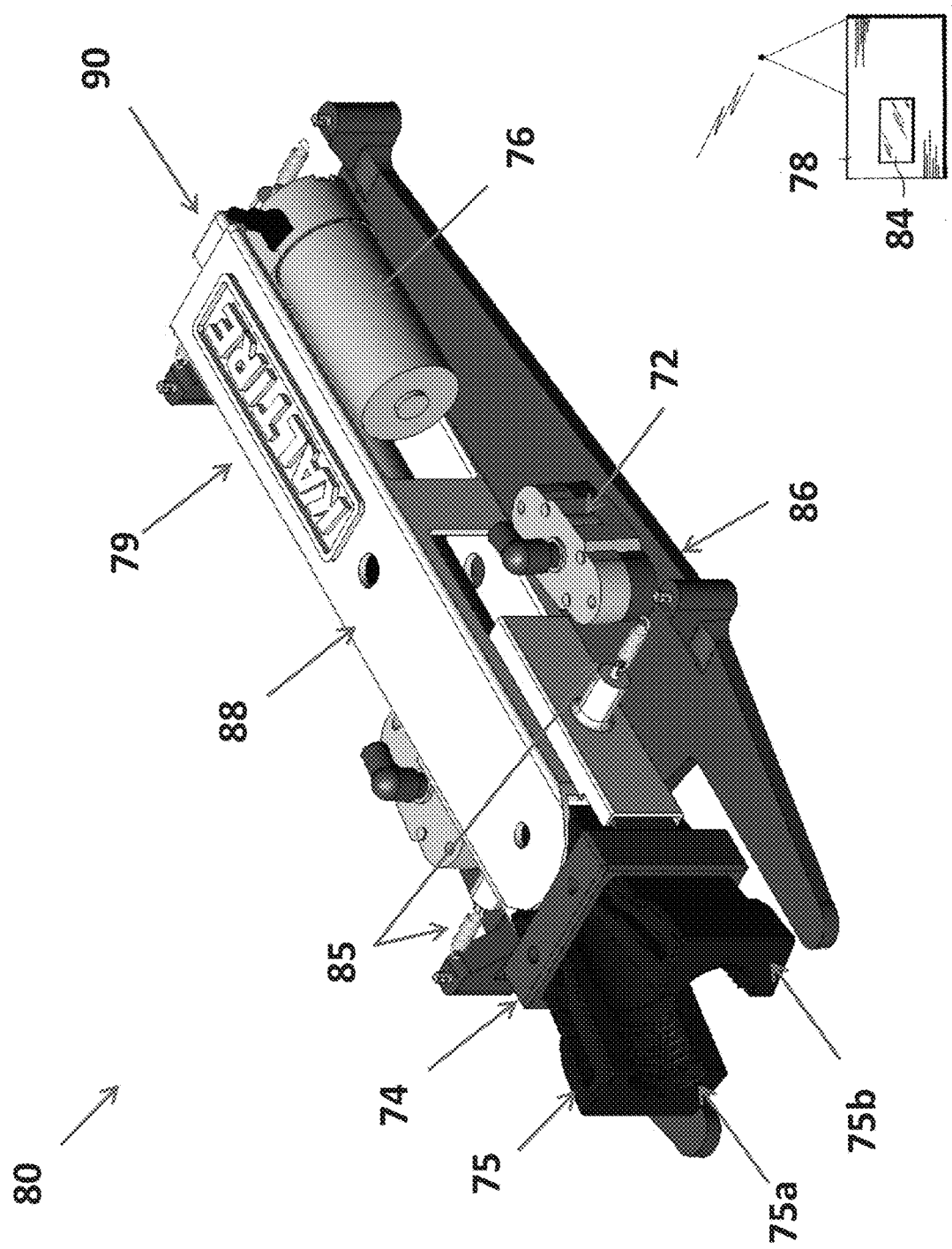
FIG. 9 is a side perspective view of the clamp device of FIG. 8 in an open position.
Figure 10:
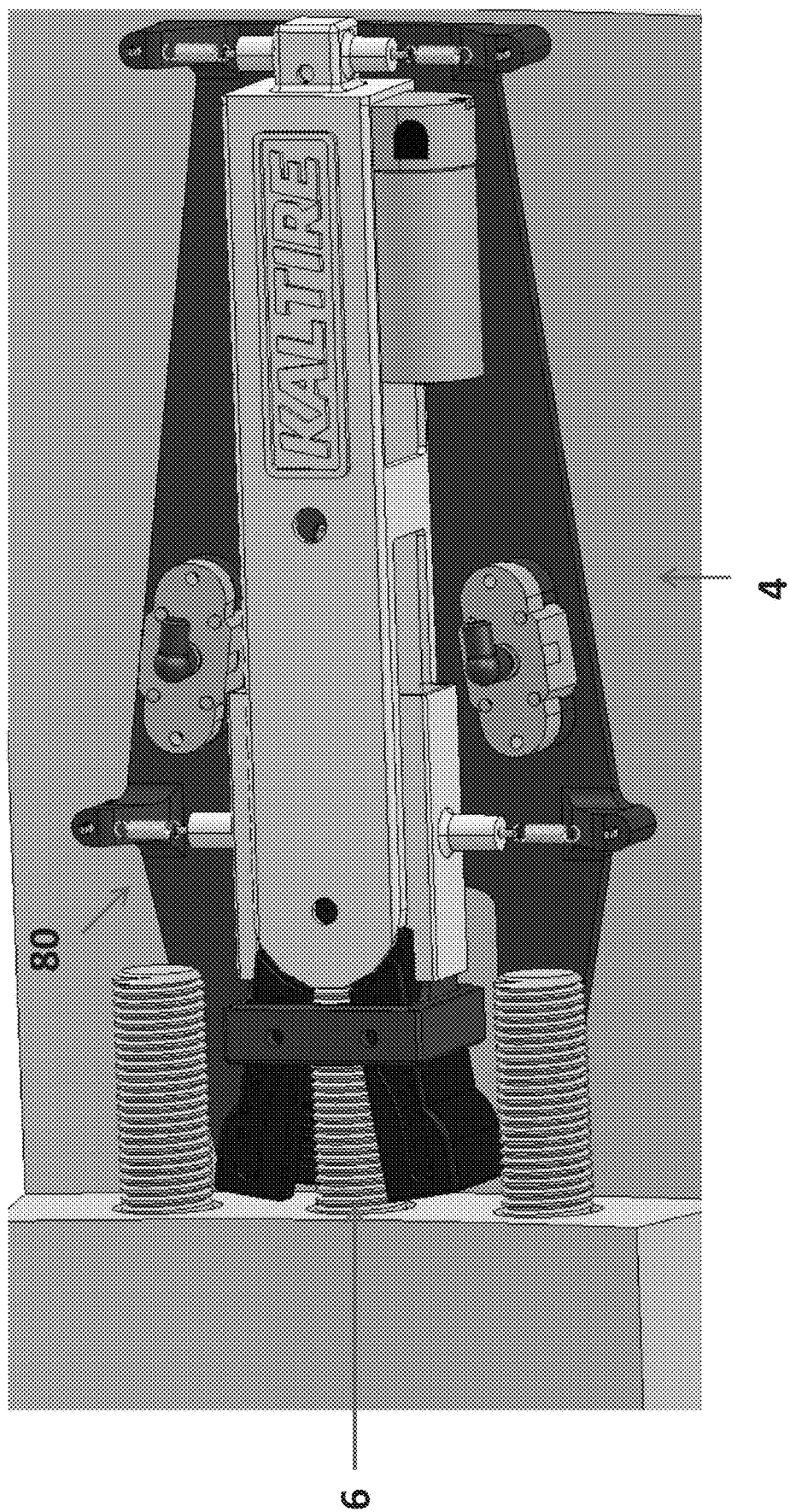
FIG. 10 is side view of the clamp device of FIG. 8 attached to a wheel and in a closed position securely holding a stud.

With reference now to FIGS. 8 to 10, a clamp device 80 is shown according to a second embodiment. The clamp device 80 in FIGS. 8 to 10 may be substantially similar to the design and operation of the clamp device 10 shown in FIGS. 2 to 7 and described above for securely holding a wheel stud 6 of a wheel 4 and includes an attachment mechanism 82 (shown as a pair of switchable magnets), an actuating link 84 (shown as a collar), a gripping mechanism 85 (shown as a pair of jaws 85a, 85b), an actuator 86, a transmitter 88 (with push button 94) and a receiver 89. In this embodiment, the clamp device 80 further includes one or more springs 95, a lower base 96, an upper base 98 and a signal means 90.

The springs 95 may be extension springs and are configured and adapted to suspend the gripping mechanism 85 such that the gripping mechanism 85 is operable to self-align onto the stud as it moves to the closed position. The lower base 96 and upper base 98, like the frame and housing described above for the clamp device 10, may be constructed of a rigid and durable material such that moisture and potential impacts to them will not damage the internal components of the clamp device 80. Such materials may include plastics, rubber, silicone, metals, alloys, treated nylons, cloth, canvas, leather and combinations thereof.

The signal means 90 may be used to indicate the position of at least one of the jaws 85a, 85b at a predetermined position (for e.g. at the open position or closed position) or the position of the actuating link 84 (for e.g. at the first or second position). For example, the signal means 90 may include a metal strip mounted on one of the jaws 85a, 85b or actuating link 84 to move therewith, a circuit having a normally open switch in the path of movement of the metal strip and an indicator light. This arrangement is such that the indicator light will be energized and lit in response to the metal strip closing the switch at a position corresponding to the closed position of the jaws 85a, 85b or at a position corresponding to the second position of the actuating link 84 (as shown in FIG. 8). Similarly, the indicator light is not energized and is unlit when the switch is open corresponding to the open position of the jaws 85a, 85b or the first position of the actuating link 84 (as shown in FIG. 9).

Figure 11:
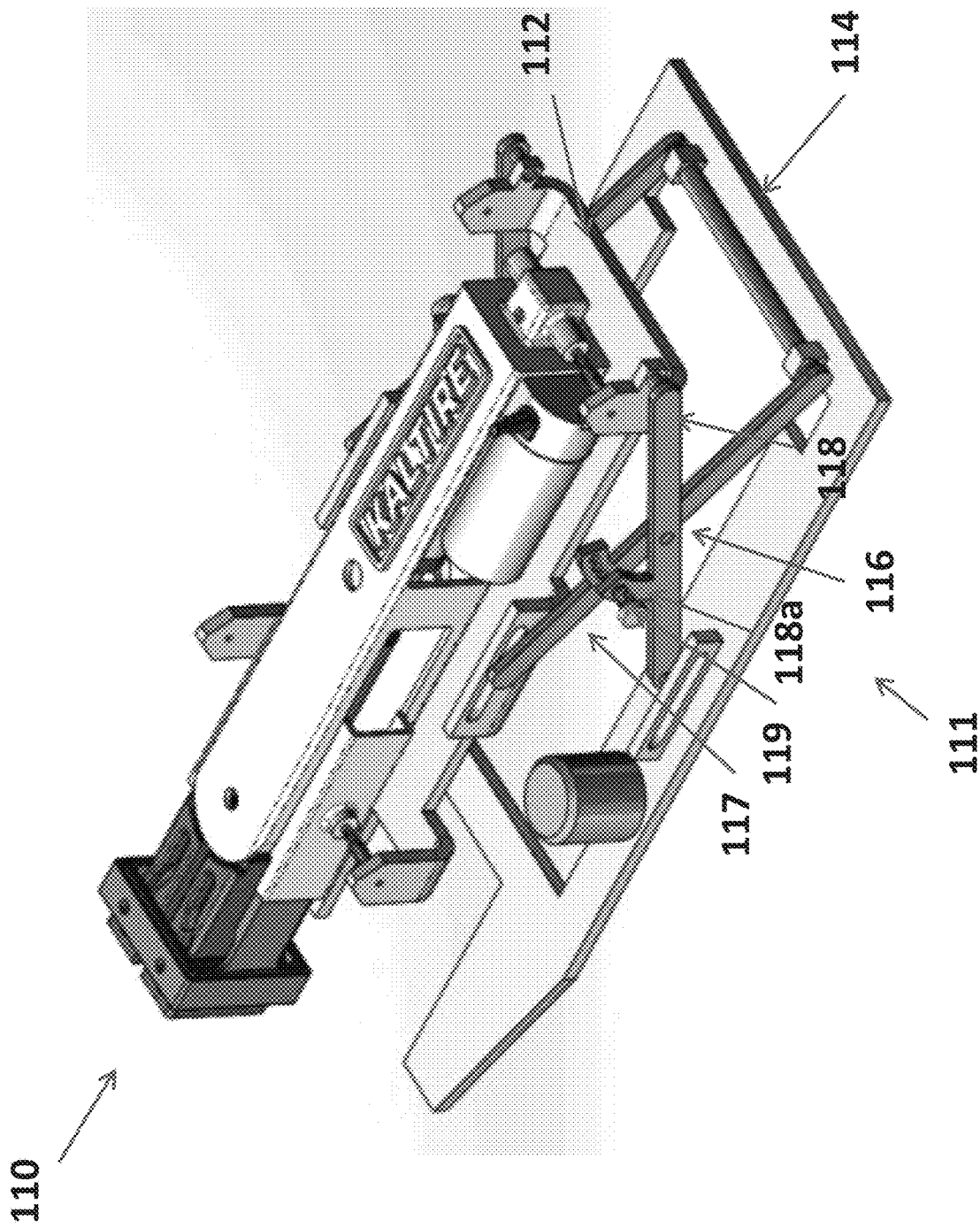
FIG. 11 is a side perspective view of a clamp device according to a third embodiment in a closed position.

With reference now to FIG. 11, a clamp device 110 is shown according to a third embodiment. The clamp device 110 in FIG. 11 may be substantially similar to the design and operation of the clamp devices 10 and 80 shown in FIGS. 2 to 10 and described above and can further include an adjustable height platform 111 that can be manipulated to raise and lower the clamp device to a height that facilitates attachment of the clamp device 110 to a stud of a wheel.

The adjustable height platform 111 includes an upper platform 112 upon which the clamp device 110 is secured, a lower platform 114 (similar to base 96 shown in FIGS. 8 and 9) and a scissors linkage 116 coupled between the lower platform 114 and upper platform 112. The scissors linkage 116 may include left and right scissors legs 117, 118 which are pivotally connected together at their middle sections to create an X centered on a pivot access and an unlocking mechanism 119. The left scissor leg 117 may include an aperture positioned above its middle section. The right scissor leg 118 may include a curved piece 118a attached to its upper surface and positioned below its middle section which includes a plurality of apertures. The aperture of the left scissor leg 117 is sized and shaped similarly to the apertures of the right scissor leg 118. The unlocking mechanism 119, shown as a pin, is sized and configured to be slidably disposed within the aperture of the left scissor leg 117 and apertures of the right scissor leg 118 when such apertures are aligned.

Thus, in operation, the adjustable height platform 111 may be in a locked position when the pin is disposed within the apertures of the left and right scissor legs 117, 118. When it is desired to raise or lower the upper platform 112 with respect to the lower platform 114, the pin is first removed from the apertures of the left and right scissor legs 117, 118. The upper platform 112 is then raised or lowered by lining up the aperture of the left scissor leg 117 with one of the apertures of the right scissor leg 119 and the pin is reinserted into the apertures. Other types of scissor lift mechanisms known to those skilled in the art may be used in place of the mechanism described herein and will not be further described in detail.

According to another embodiment, the present disclosure provides a method of using the clamp device in place of lug nuts to remotely and temporarily secure and release the gripping mechanism of the clamp device from a stud of a wheel during the removal and installation of the wheel. The wheel may be any wheel known and used in connection with large vehicles (for e.g. wheel loaders, backhoes, tractors, graders, trenchers, semi-trucks and the like) such as off-the-road ("OTR") wheels, agricultural or commercial wheels.

In a first step during the removal of the wheel from the large vehicle, at least one lug nut, preferably two lug nuts are removed from their corresponding studs, such as the studs positioned at the 3:00 and 9:00 positions on the hub. The clamp devices of the present disclosure are then attached to the wheel by their attachment mechanisms such that their gripping mechanisms, in open positions, are placed over the exposed studs. The user may then transmit a wireless signal to the receivers of each clamp device via the transmitter to cause the actuators of each clamp device to move their actuating links from the first position to second position, thus moving the gripping mechanisms from the open position to closed position. The user may confirm that the studs are securely attached to and engaged with the gripping mechanisms by checking the position of the actuating links of each clamp device and/or if their indicator lights are illuminated. The user may then remove the remaining lug nuts from the studs and then subsequently move away from the work area. A tire manipulator may then be used to grab the wheel. The user may then transmit a second signal via the transmitter to the receivers of the clamp devices to cause their actuators to move the actuating links from the second position to the first position, thus opening the gripping mechanisms. The tire manipulator may then remove the wheel from the large vehicle and position it horizontally on the floor. Each clamp device may be removed from the wheel by disengaging the attachment mechanisms from the wheel.

When it's desired to install the wheel onto the large vehicle, two clamp devices can be secured to the wheel in line with, for example, the 3:00 and 9:00 stud holes on the wheel. The positioning does not have to be exact as the gripping mechanism is configured to self-align to the stud upon engagement. The user may then leave the work area to allow a tire manipulator to grab and position the wheel onto the large vehicle. The user may then remotely transmit a signal to the receivers of each clamp device via the transmitter to cause the actuator to move the actuating links from the first position to second position, thus closing the gripping mechanisms of each clamp device onto the corresponding studs. The user may then confirm that each clamp device is securely attached to each stud by confirming that the actuating link has moved to the second position and that the indicator lights on each clamp device are illuminated. The tire manipulator may then be released from the wheel and moved away from the work area. The user may then install lug nuts on each stud, except for the two studs that accommodate the two clamp devices. The user can then transmit a second signal to the receivers of each clamp device to cause the actuator to move the actuating links from the second position to the first position, thus opening the gripping mechanisms of each clamp device. The user may then remove each clamp device from the wheel by disengaging the attachment mechanism of each clamp device. The final lug nuts may then be installed on the two remaining exposed studs.

While the foregoing is directed to embodiments of the present disclosure, other and further embodiments of the disclosure may be devised without departing from the basic scope thereof, and the scope thereof is determined by the claims that follow.

What is claimed is:

1. A remotely operated clamp device, comprising:
 a gripper operable for gripping a stud of a wheel mounting assembly, the gripper movable between an open position and a closed position;
 an actuating link engaging the gripper, the actuating link selectively movable between a first position and a second position, the gripper being in the open position when the actuating link is in the first position and the gripper being in the closed position when the actuating link is in the second position;
 an actuator engaging the actuating link and selectively moving the actuating link to the first position and the second position;
 a connector operable for attaching the clamp device to a wheel of the wheel mounting assembly;
 a transmitter for transmitting operating commands inputted by a user; and
 a receiver controlling the actuator and causing the actuator to selectively move the actuating link to the first position and to the second position in response to the operating commands.

2. The clamp device of claim 1, wherein the actuator is an electromagnetic actuator.

3. The clamp device of claim 1, wherein the connector is a switchable magnetic device.

4. The clamp device of claim 1, further comprising at least two springs configured to suspend the gripper such that the gripper is operable to self-align onto the stud of the wheel as it moves to the closed position.

5. The clamp device of claim 1, wherein the actuator comprises a toggle switch configured and operable such that the actuating link may be selectively moved to the first position and the second position manually.

6. A method of temporarily holding a wheel mounted onto a hub of a wheel mounting assembly, the hub having a plurality of studs onto which the wheel is mounted, the method comprising:
 (a) attaching the clamp device according to claim 1 by the connector to the wheel over and in line with a stud selected from the plurality of wheel studs;
 (b) transmitting a first operating command from the transmitter to the receiver to cause the actuator to move the actuating link to the second position thereby moving the gripper to the closed position to hold the wheel mounted onto the hub;
 (c) transmitting a second operating command from the transmitter to the receiver to cause the actuator to move the actuating link to the first position thereby moving the gripper to the open position; and
 (d) releasing the connector from the wheel.

7. The clamp device of claim 1, further comprising an outer housing surrounding at least one of the gripper, the actuating link, the actuator and the receiver.

8. The clamp device of claim 7, wherein the outer housing is constructed of plastic, rubber, silicone, a metal, an alloy, a treated nylon, cloth, canvas, leather or a combination thereof.

9. The clamp device of claim 1, wherein the gripper comprises a pair of pivotally attached jaws.

10. The clamp device of claim 9, wherein the actuating link is a collar configured to be movably disposed over the pair of pivotally attached jaws.

11. The clamp device of claim 9, further comprising an indicator light configured to illuminate when the pair of jaws are in the closed position.

12. A remotely operated clamp device comprising:
- a gripper operable for gripping a stud of a wheel mounting assembly, the gripper movable between an open position and a closed position;
- an actuating link engaging the gripper, the actuating link selectively movable between a first position and a second position, the gripper being in the open position when the actuating link is in the first position and the gripper being in the closed position when the actuating link is in the second position;
- an actuator engaging the actuating link and selectively moving the actuating link to the first position and the second position;
- a connector for attaching the clamp device to a wheel of the wheel mounting assembly;
- an adjustable height platform operable to be raised and lowered to a height that facilitates attachment of the clamp device to the stud of the wheel;
- a transmitter for transmitting operating commands inputted by a user; and
- a receiver controlling the actuator and causing the actuator to selectively move the actuating link to the first position and to the second position in response to the operating commands.

13. The remotely operated clamp device of claim 12, wherein the adjustable height platform comprises an upper platform upon which the clamp device is secured, a lower platform and a scissors linkage coupled between the lower platform and upper platform.

14. The remotely operated clamp device of claim 12, further comprising an indicator light configured to illuminate when the gripper is in the closed position.

15. The remotely operated clamp device of claim 12, further comprising at least two springs configured to suspend the gripper such that the gripper is operable to self-align onto the stud of the wheel as it moves to the closed position.

16. A method of temporarily holding a wheel mounted onto a hub of a wheel mounting assembly, the hub having a plurality of studs onto which the wheel is mounted, the method comprising:
(a) attaching the clamp device according to claim 12 by the connector to the wheel;
(b) manipulating the adjustable height platform such that the clamp device is over and in line with a stud selected from the plurality of wheel studs;
(c) transmitting a first operating command from the transmitter to the receiver to cause the actuator to move the actuating link to the second position thereby moving the gripper to the closed position to hold the wheel mounted onto the hub;
(d) transmitting a second operating command from the transmitter to the receiver to cause the actuator to move the actuating link to the first position thereby moving the gripper to the open position; and
(e) releasing the connector from the wheel.

\* \* \* \* \*